US010965200B2

United States Patent
Seufert et al.

(10) Patent No.: US 10,965,200 B2
(45) Date of Patent: Mar. 30, 2021

(54) ROTATING ELECTRIC MACHINE

(71) Applicant: Siemens Aktiengesellschaft, Munich (DE)

(72) Inventors: Reiner Seufert, Salz (DE); Rolf Vollmer, Gersfeld (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 16/962,470

(22) PCT Filed: Dec. 18, 2018

(86) PCT No.: PCT/EP2018/085446
§ 371 (c)(1),
(2) Date: Jul. 15, 2020

(87) PCT Pub. No.: WO2019/141463
PCT Pub. Date: Jul. 25, 2019

(65) Prior Publication Data
US 2021/0006142 A1 Jan. 7, 2021

(30) Foreign Application Priority Data
Jan. 16, 2018 (EP) ..................................... 18151826

(51) Int. Cl.
*H02K 16/00* (2006.01)
*H02K 21/40* (2006.01)
(Continued)

(52) U.S. Cl.
CPC ............... *H02K 21/40* (2013.01); *H02K 1/18* (2013.01); *H02K 1/20* (2013.01)

(58) Field of Classification Search
CPC ........ H02K 16/00; H02K 16/02; H02K 21/12; H02K 1/27; H02K 7/006
See application file for complete search history.

(56) References Cited

U.S. PATENT DOCUMENTS

| 7,821,168 B2 * | 10/2010 | Halstead .................. H02K 7/09 |
| | | 310/156.32 |
| 2010/0176679 A1 * | 7/2010 | Ichiyama ............... H02K 21/38 |
| | | 310/156.35 |
| 2018/0233977 A1 * | 8/2018 | Volkmuth ................ H02K 1/20 |

FOREIGN PATENT DOCUMENTS

| CN | 106374707 A | 2/2017 |
| DE | 10 2016 106 187 A1 | 10/2017 |

(Continued)

OTHER PUBLICATIONS

*PCT International Search Report and Written Opinion of International Searching Authority dated Feb. 4, 2019 corresponding to PCT International Application No. PCT/EP2018/085446 filed Dec. 18, 2018.*

Primary Examiner — Dang D Le
(74) *Attorney, Agent, or Firm* — Henry M. Feiereisen LLC

(57) ABSTRACT

A rotating electric machine includes a stator having a segment pair of first and second active part segments, and a rotor mounted for rotation about an axis of rotation relative to the stator and including a ring-shaped reaction element extending along a reaction element circle about the axis of rotation, with a circular arc of the reaction element circle running between the two active part segments. The rotor includes magnetizable regions arranged in series along the reaction element circle, with a non-magnetic region being arranged between two adjacent magnetizable regions. The first active part segment of the segment pair of the stator includes a number of electromagnets arranged in series along a course of the circular arc, and the second active part segment of the segment pair of the stator includes a number of permanent magnets arranged in series along the course of the circular arc.

18 Claims, 5 Drawing Sheets

(51) Int. Cl.
 *H02K 1/18* (2006.01)
 *H02K 1/20* (2006.01)

(56) References Cited

FOREIGN PATENT DOCUMENTS

EP   2 806 546 A1   11/2014
EP   3 131 189 A1   2/2017

* cited by examiner

ROTATING ELECTRIC MACHINE

CROSS-REFERENCES TO RELATED APPLICATIONS

This application is the U.S. National Stage of International Application No. PCT/EP2018/085446, filed Dec. 18, 2018, which designated the United States and has been published as International Publication No. WO 2019/141463 A1 and which claims the priority of European Patent Application, Serial No. 18151826.7, filed Jan. 16, 2018, pursuant to 35 U.S.C. 119(a)-(d).

BACKGROUND OF THE INVENTION

The Invention relates to a rotating electric machine.

Rotating electric machines have a stator and a rotor which is rotatable about an axis of rotation relative to the stator. The stator and/or the rotor have magnets for generating magnetic fields. The magnets are electromagnets and/or permanent magnets and are generally arranged on the stator and/or on the rotor along circles around the axis of rotation. With large rotating electric machines, in other words with large radii of these circles, a corresponding number and/or size of magnets is required. This results in high costs for the provision of magnets on such machines.

The object underlying the invention is to specify a rotating electric machine, which is improved in particular in respect of the costs involved in magnet provision.

SUMMARY OF THE INVENTION

The object is achieved in accordance with the invention by a rotating electric machine having a stator and a rotor which is rotatable about an axis of rotation relative to the stator. The rotor has a ring-shaped reaction element which runs along a reaction element circle about the axis of rotation and has a number of magnetizable regions arranged in series along the reaction element circle, wherein a non-magnetic region is arranged in each case between two magnetizable regions adjacent to one another. The stator has at least one segment pair comprising two active part segments, between which a circular arc of the reaction element circle runs. A first active part segment of each segment pair has a number of electromagnets arranged in series along the course of the circular arc and the second active part segment of the segment pair has a number of permanent magnets arranged in series along the course of the circular arc.

Advantageous embodiments of the invention form the subject matter of the subclaims.

With an inventive rotating electric machine, only the stator has active magnetic components, in other words electromagnets and permanent magnets, while the rotor is free of such components and only has a reaction element with magnetizable regions.

Moreover, the interacting electromagnets and permanent magnets are arranged on different sides of the reaction element. On account of this arrangement of the electromagnets and the permanent magnets, the permanent magnets do not reduce the installation space for the coil windings of the electromagnets in an active part of the stator. This permits an improvement in the geometric arrangement of the coil windings of the electromagnets by optimizing the groove geometry of grooves, into which the coil windings run, and thus improving the magnetic circle and the degree of efficiency of the electric machine with respect to an arrangement of electromagnets and permanent magnets in the same active part of the machine.

Furthermore, the permanent magnets are not heated significantly by the electromagnets, since they are arranged at a distance from the electromagnets on another side of the reaction element. As a result, the degree of efficiency of the electric machine is improved, since losses developing as a result of the permanent magnets heating up are reduced, or more cost-effective permanent magnets, for instance permanent magnets with relatively light rare earths, can be used in order to achieve an intended degree of efficiency than with an arrangement of electromagnets and permanent magnets in the same active part of the machine.

The arrangement of the electromagnets and permanent magnets on different sides of the reaction element moreover reduces the attractive force of the stator on the reaction element with respect to an arrangement of electromagnets and permanent magnets on the same side of the reaction element. This relieves the mounting of the reaction element, or a more cost-effective mounting of the reaction element can be used than with an arrangement of the electromagnets and permanent magnets on the same side of the reaction element.

Furthermore, the electromagnets and permanent magnets are arranged in active part segments, which are each only arranged in the region of a circular arc of the reaction element circle, in other words only in a subregion of the reaction element circle. As a result, the stator can be provided in a modular manner with active part segments, the number and arrangement of which can be flexibly adjusted to the respective requirements on the electric machine. In particular, electromagnets and permanent magnets are generally not arranged along the entire periphery of the reaction element, so that the number of magnets and the costs involved in providing magnets to the stator in respect of an arrangement of magnets along the entire periphery of the reaction element can also be reduced as a result.

One embodiment of the invention provides that the active part segments of each segment pair are arranged on radially opposing sides of the reaction element with respect to the reaction element circle. This embodiment of the invention generally allows for a more simple coupling of the rotor with an element to be driven by the electric machine than an arrangement of the active part segments for instance on sides of the reaction element which oppose one another axially with respect to the axis of rotation, since an arrangement of the active part segments on radially opposing sides of the reaction element allows for a direct axial connection of the reaction element with the element to be driven.

A further embodiment of the invention provides that the stator has a number of segment pairs which are arranged equidistantly from one another along the reaction element circle. This embodiment of the invention allows for a more uniform impact of the active part segments on the reaction element than only one segment pair or an arrangement of a number of segments pairs for instance in just one region of the reaction element circle.

A further embodiment of the invention provides that the stator has an even number of segment pairs and the first active part segments of each two adjacent segment pairs are arranged on different sides of the reaction element. In other words, this embodiment of the invention provides that the first active part segments along the reaction element circle are arranged alternately on different sides of the reaction element and the second active part segments along the reaction element circle are accordingly likewise arranged alternately on different sides of the reaction element. As a result, the attractive forces of the active part segments on the reaction element neutralize which additionally relieves the mounting of the reaction element.

A further embodiment of the invention provides a mounting apparatus for mounting the reaction element on the stator. As a result, on account of the mounting apparatus very small air gaps between the reaction element and the active part segments of the stator can be set and adhered to, as a result of which advantageously very high torques can be exerted onto the reaction element by means of the active part segments.

A further embodiment of the invention provides that the reaction element is displaceably mounted relative to the stator in a plane which is at right angles to the axis of rotation. In other words, this embodiment of the invention provides that the reaction element is not only mounted rotatably about the axis of rotation, but instead also displaceably in a plane which is at right angles to the axis of rotation, for instance by the afore-cited mounting apparatus also permitting small displacements in this plane. As a result, advantageously manufacturing tolerances and changes in expansion of the reaction element due to thermal causes and/or the active part segments can be balanced out.

A further embodiment of the invention provides for a cooling apparatus for cooling all first active part segments and/or all second active part segments. As a result, advantageously losses caused by heating the electromagnets and/or permanent magnets of the active part segments can be reduced and the degree of efficiency of the electric machine can thus be increased.

A further embodiment of the invention provides that each two adjacent permanent magnets of each second active part segment have magnetic polarities which oppose one another. As a result, advantageously the magnetic drive can be realized by the permanent magnets.

A further embodiment of the invention provides that two adjacent permanent magnets of the second active part segment of the segment pair face each electromagnet of the first active part segment of each segment pair. As a result, advantageously the arrangement of the permanent magnets of the second active part is adjusted to the arrangement of the electromagnet of the first active part.

A further embodiment of the invention provides that the first active part segment of each segment pair has twelve electromagnets. For instance, here the reaction element has seventeen or nineteen magnetizable regions in the region of each segment pair. The arrangement of twelve electromagnets in a first active part segment and the arrangement of seventeen or nineteen magnetizable regions of the reaction element have surprisingly proven to be particularly effective in the region of these twelve electromagnets.

A further embodiment of the invention provides that the electromagnets of the first active part segment of each segment pair are fed with a three-phase electric current system, wherein each electromagnet is assigned to a phase of the current system. This advantageously enables the use of a three-phase electric current system for operating the electric machine. For instance, here the electromagnets of each phase of the current system form magnet pairs of in each case two electromagnets adjacent to one another, which have magnetic polarities which differ from one another, a magnet pair of each of the two other phases lies between two magnet pairs of each phase and two adjacent electromagnets of phases which differ from one another have the same magnetic polarity. An electromagnet of one phase of the current system is understood here to mean an electromagnet assigned to this phase. The afore-cited assignment of the electromagnets to the phases and their polarity has proven to be particularly advantageous.

A further embodiment of the invention provides that the non-magnetic regions of the reaction element are manufactured from a ceramic material. Ceramic materials are particularly suited to manufacturing the non-magnetic regions of the reaction element on account of their magnetic and mechanical properties.

A further embodiment of the invention provides that the magnetizable regions of the reaction element are produced from a soft-magnetic material. Soft-magnetic materials can be easily magnetized in a magnetic field and are therefore suited particularly advantageously to producing the magnetizable regions of the reaction element.

BRIEF DESCRIPTION OF THE DRAWING

The afore-described properties, features and advantages of this invention and the manner in which these are achieved will become clearer and more clearly intelligible in conjunction with the following description of exemplary embodiments which are explained in more detail in conjunction with the drawings.

The drawings show.

DETAILED DESCRIPTION OF PREFERRED EMBODIMENTS

Figure 1:
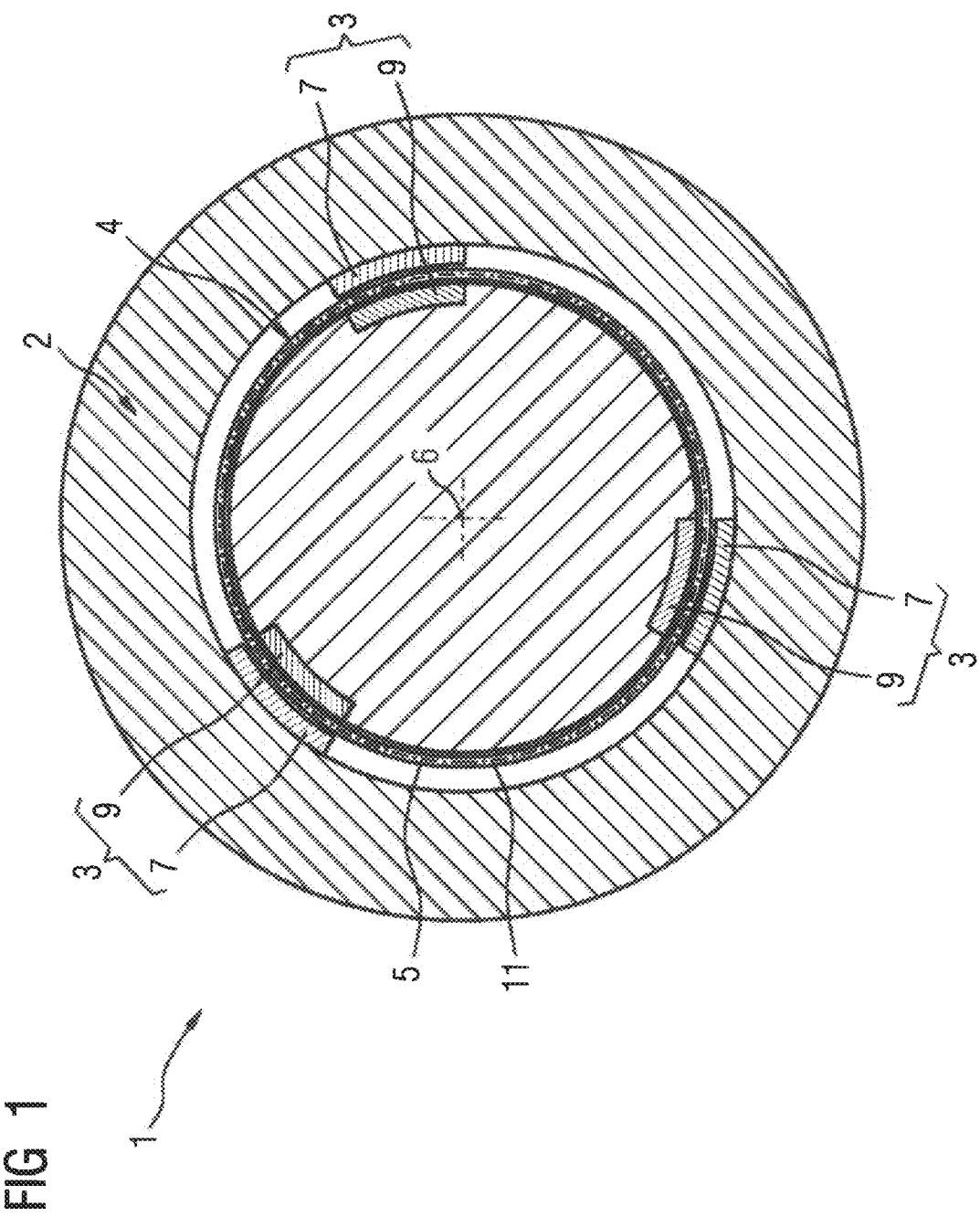
FIG. 1 a first exemplary embodiment of a rotating electric machine in a sectional representation with a sectional plane at right angles to the axis of rotation of the machine, FIG. 2 a sectional representation of a segment pair of two active part segments and a reaction element of a rotating electric machine, FIG. 3 a perspective representation of a segment pair of two active part segments and a reaction element of a rotating electric machine, FIG. 4 a sectional representation of a first active part segment of a rotating electric machine, FIG. 5 a second exemplary embodiment of a rotating electric machine in a sectional representation with a sectional plane, in which the axis of rotation of the machine is situated.

Parts which correspond to one another are provided with the same reference characters in the figures.

FIG. 1 shows a schematic representation of a first exemplary embodiment of a rotating electric machine 1. The electric machine 1 has a stator 2 and a rotor 4 which is rotatable about an axis of rotation 6 relative to the stator 2. FIG. 1 shows a sectional representation with a sectional plane at right angles to the axis of rotation 6.

The rotor 4 has a ring-shaped reaction element 5, which runs along a reaction element circle 11 about the axis of rotation 6.

The stator 2 has three segment pairs 3 per two active part segments 7, 9 arranged equidistantly from one another along the reaction element circle 11. The two active part segments 7, 9 of each segment pair 3 are arranged on radially opposing sides of the reaction element 5 with respect to the reaction element circle 11, so that a circular arc of the reaction element circle 11 runs between the two active part segments 7, 9.

Figure 2:
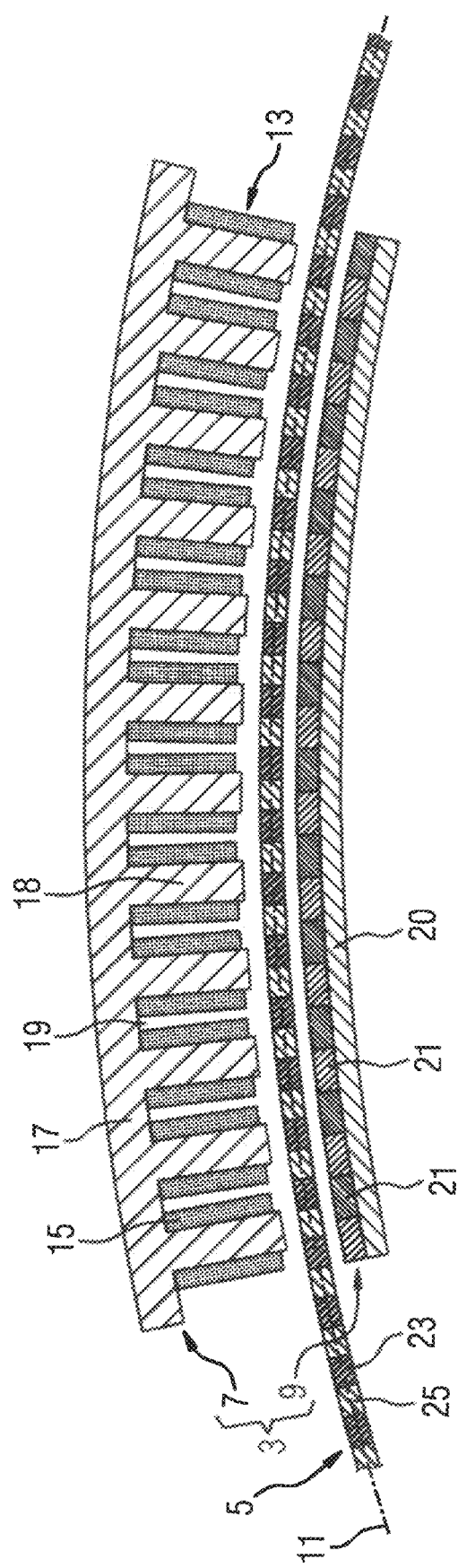
Figure 3:
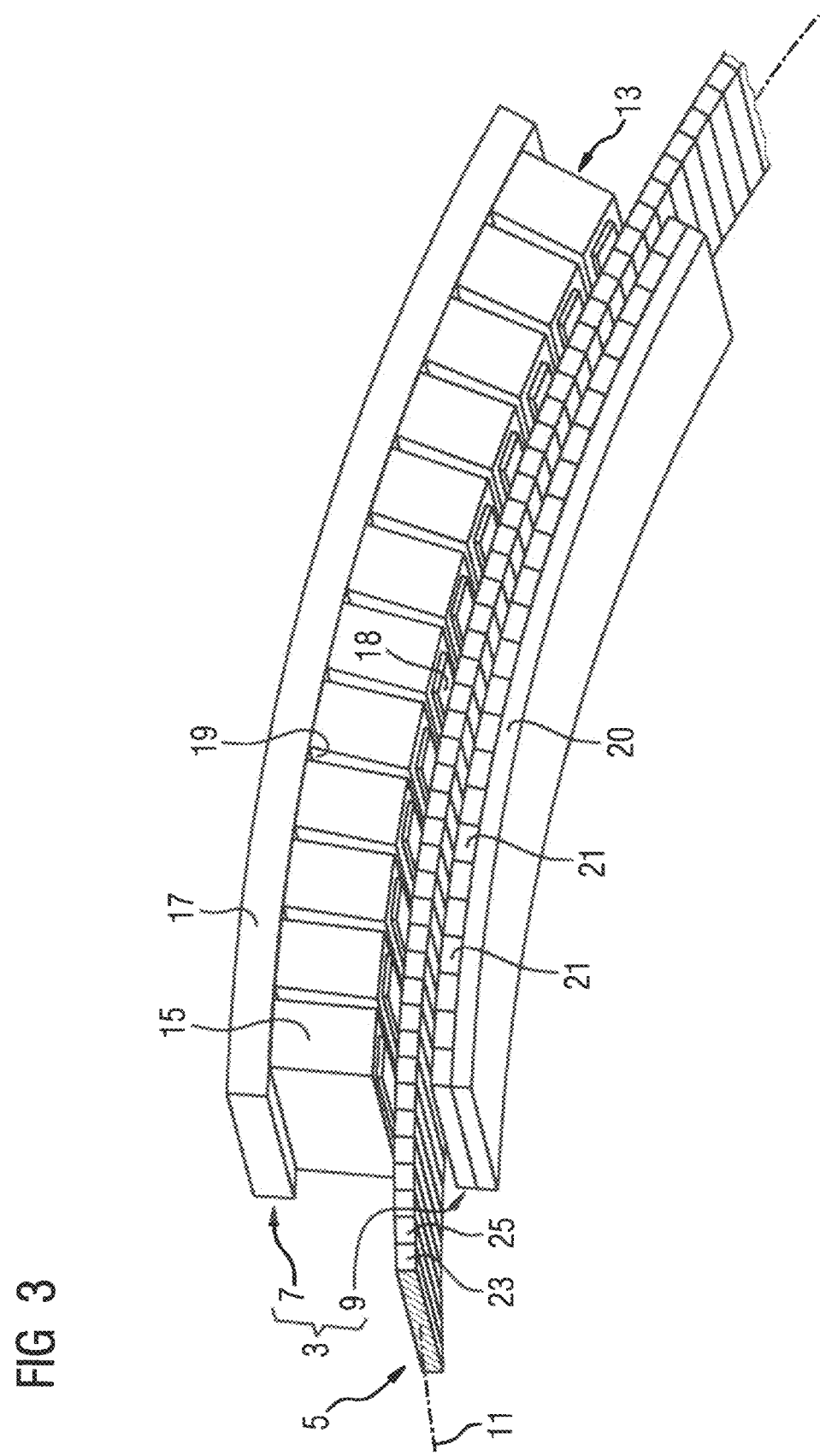

FIGS. 2 and 3 show in each case a segment pair 3 and a section of the reaction element 5 of the rotating electric machine 1 shown in FIG. 1. Here FIG. 2 shows a sectional representation and FIG. 3 shows a perspective representation.

A first active part segment 7 of each segment pair 3 has a number of electromagnets 13, which are arranged in series along the course of the circular arc of the circular arc of the reaction element circle 11 which runs between the two active part segments 7, 9 of the segment pair 3. The electromagnets 13 each have a coil winding 15 of an electric col. The first active part 7 further has an active part laminated core 17 with teeth 18 facing the second active part segment 9 and grooves 19 running between the teeth 18, wherein a coil winding 15 is wound around each tooth 18 so that the col windings 15 of two electromagnets 13 run through each groove 19. In other exemplary embodiments, instead of just one active part laminated core 17 the first active part segment 7 can have a number of active part laminated cores 17 for one electromagnet 13 or a number of electromagnets 13 in each case.

The second active part segment 9 of each segment pair 3 has a number of permanent magnets 21 arranged in series on a permanent magnet support 20 along the course of the circular arc, wherein two adjacent permanent magnets 21 of the second active part segment 9 oppose each electromagnet 13 of the first active part segment 7 of the segment pair 3. Two adjacent permanent magnets 21 of each second active part segment 7 have magnetic polarities which oppose one another.

The first active part segments 7 are in each case arranged on the side of the reaction element 5 facing away from the axis of rotation 6 and the second active part segments 9 are arranged in each case on the side of the reaction element 5 facing the axis of rotation 6.

The reaction element 5 has a number of non-magnetic regions 23 and a number of magnetizable regions 25. The non-magnetic regions 23 and the magnetizable regions 25 are arranged alternately along the reaction element circle 11 so that a non-magnetic region 23 is arranged between two adjacent magnetizable regions 25 in each case and a magnetizable region 25 is arranged between two adjacent non-magnetic regions 23 in each case.

The non-magnetic regions 23 are each produced from a non-magnetic material, for instance from a ceramic material or from a fiber-reinforced plastic.

The magnetizable regions 25 are in each case produced at least partially from a magnetizable material, for instance from a soft-magnetic material. The magnetizable regions 25 in each case preferably have a laminated core consisting of laminations.

The expansion of a magnetizable region 25 along the reaction element circle 11 amounts for instance to between 80% and 120% of the expansion of a non-magnetic region 23.

Figure 4:
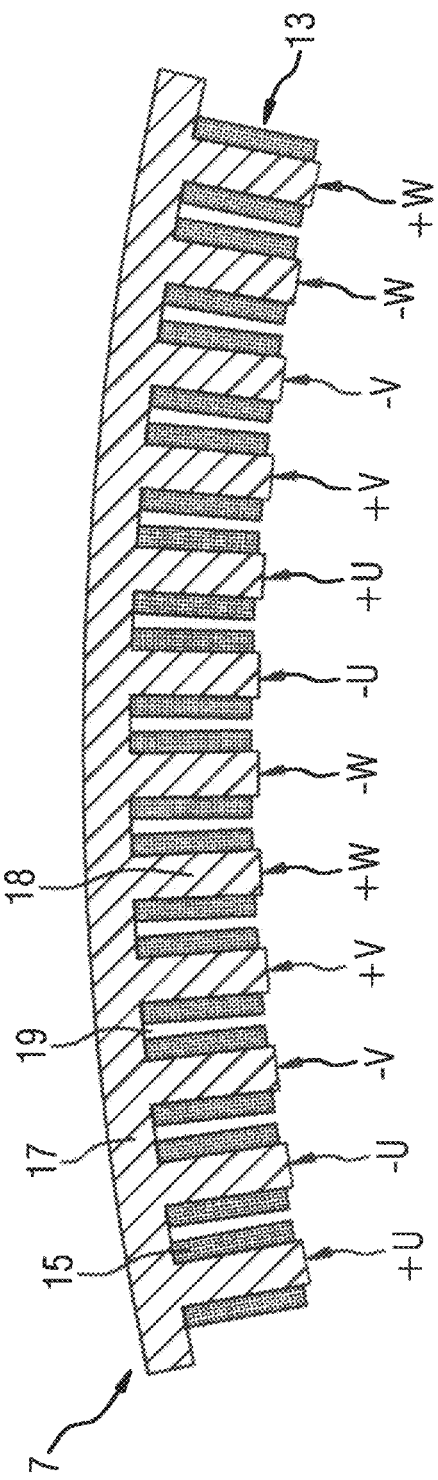

FIG. 4 shows a sectional representation of a first active part segment 7. The electromagnets 13 of the first active part segment 7 are fed with a three-phase electric current system, wherein each electromagnet 13 is assigned to a phase U, V, W of the current system. Here the electromagnets 13 of each phase U, V, W of the current system form magnet pairs of two adjacent electromagnets 13 in each case, which have magnetic polarities which differ from one another, a magnet pair of each of the two other phases U, V, W lies between two magnet pairs of each phase U, V, W and two adjacent electromagnets 13 of phases U, V. W which differ from one another have the same magnetic polarity.

In the exemplary embodiment shown in FIGS. 2 to 4, each first active part segment 7 has twelve electromagnets 13 and each second active part segment 9 has twenty-four permanent magnets 21. The reaction element 5 has seventeen magnetizable regions 25 in the region of a segment pair 3. In other exemplary embodiments, a segment pair 3 can have other numbers of electromagnets 13 and permanent magnets 21 and the reaction element 5 can have another number of magnetizable regions 25 and non-magnetic regions 23 in the region of the region of a segment pair 3. Furthermore, with other exemplary embodiments there can be provision for an assignment of the electromagnets 13 to phases U, V, W which deviates from FIG. 4.

However, it has proven to be particularly advantageous if a first active part segment 7 has twelve electromagnets 13, a second active part segment 9 has twenty four permanent magnets 21, the reaction element 5 in the region of a segment pair 3 has seventeen or nineteen magnetizable regions 25 and the electromagnets 13 are assigned to the phases U, V, W as in FIG. 4.

Figure 5:
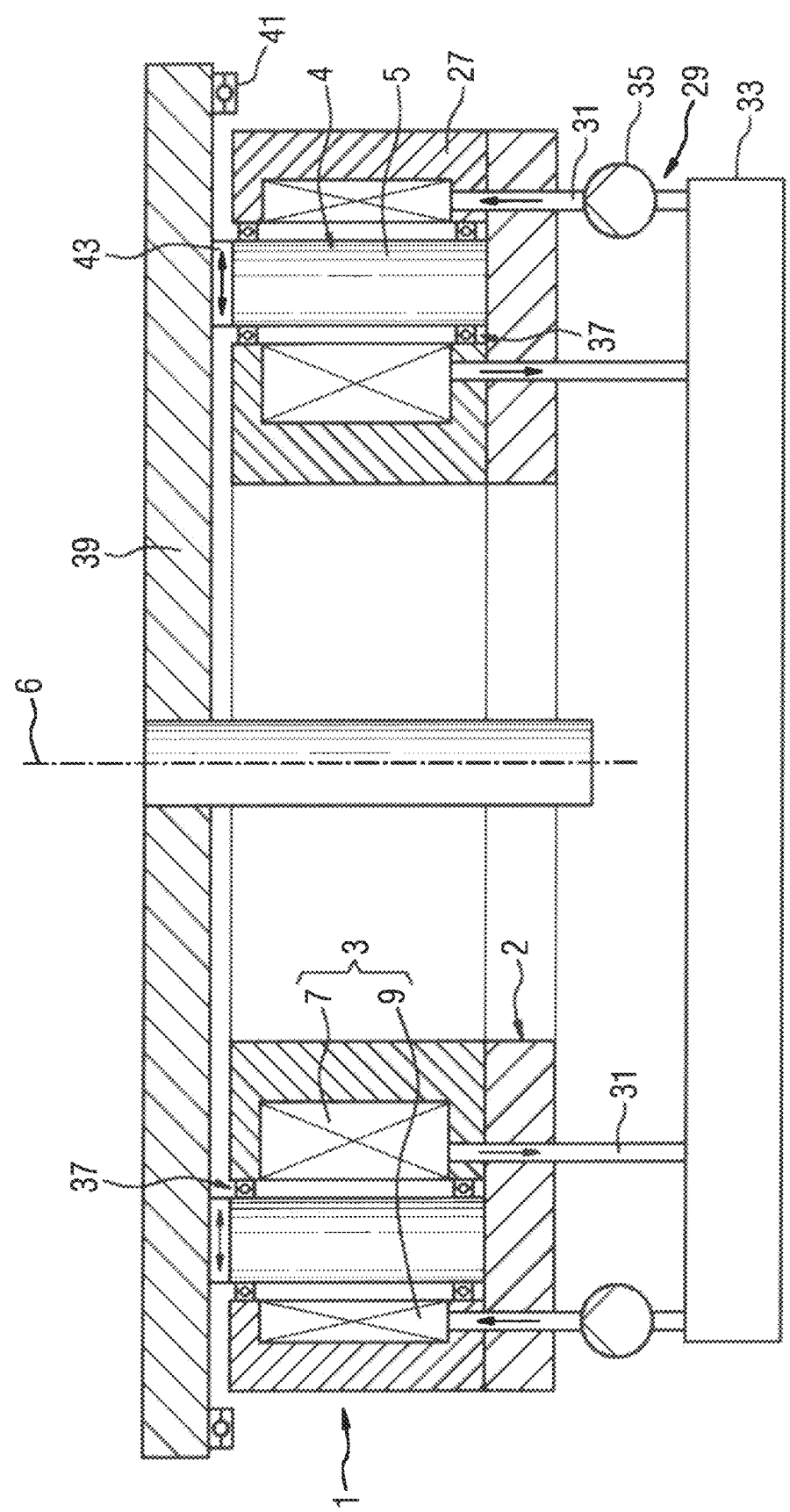

FIG. 5 shows a second exemplary embodiment of a rotating electric machine 1. The electric machine 1 has a stator 2 and a rotor 4 which is rotatable about an axis of rotation 6 relative to the stator 2. FIG. 5 shows a sectional representation with a sectional plane, in which the axis of rotation 6 lies.

The rotor 4 has a ring-shaped reaction element 5, which runs along a reaction element circle 11 about the axis of rotation 3 and is embodied like the reaction element 5 of the exemplary embodiment described on the basis of FIGS. 1 to 4.

The stator 2 has a number of segment pairs 3 of two active part segments 7, 9 which are arranged at a distance from one another along the reaction element circle 11. The two active part segments 7, 9 of each segment pair 3 are arranged on a segment carrier 27 on radially opposing sides of the reaction element 5 with respect to the reaction element circle 11 so that a circular arc of the reaction element circle 11 runs between the two active part segments 7, 9. The two active part segments 7, 9 of each segment pair 3 are embodied like the active part segments 7, 9 of the exemplary embodiment described on the basis of FIGS. 1 to 4, wherein in turn a first active part segment 7 of each segment pair 3 has electromagnets 13 and the second active part segment 9 has permanent magnets 21.

Contrary to the exemplary embodiment described on the basis of FIGS. 1 to 4, the first active part segments 7 of the exemplary embodiment shown in FIG. 5 are however arranged in each case on the side of the reaction element 5 facing the axis of rotation 6 and the second active part segments 9 are arranged in each case on the side of the reaction element 5 facing away from the axis of rotation 6. Furthermore, the stator 2 of this exemplary embodiment has an even number of segment pairs 3, wherein two segment pairs 3 each oppose one another diametrically with respect to the reaction element circle 11.

The electric machine 1 further has a cooling apparatus 29 for cooling the active part segments 7, 9. The cooling apparatus 29 has a coolant circuit, in which a coolant, for instance cooling water, is guided into cooling pipes 31 from a coolant reservoir 33 by means of pumps 35 to the active part segments 7, 9 and from the active part segments 7, 9 back into the coolant reservoir 33.

Furthermore, the electric machine 1 has a mounting apparatus 37 for mounting the reaction element 5 on the stator 2. The mounting apparatus 37 has for instance friction bearings or roller bearings, with which the side facing the axis of rotation 6 and the side of the reaction element 5 facing away from the axis of rotation 6 are mounted on the stator 2 in each case. Furthermore, the reaction element 5 can be displaceably mounted in a plane at right angles to the axis of rotation 6 relative to the stator 2 by means of the mounting apparatus 37.

The rotor 4 is connected to a drive table 39 mounted rotatably about the axis of rotation 6 with one of the support bearings 41, by way of which for instance a telescope, a rotary table, a wind power tower or a flywheel is rotatable with the electric machine 1. Here the rotor 4 and the rotary table 6 can be mounted displaceably relative to one another in a plane at right angles to the axis of rotation 6, for instance by means of spring elements 43, which can each be deformed elastically in a radial direction with respect to the reaction element circle 11 and connect the reaction element 5 to the drive table 39.

The exemplary embodiments of an electric machine 1 described on the basis of FIGS. 1 to 5 can be modified in a variety of ways. For instance, the exemplary embodiment also described on the basis of FIGS. 1 to 4 can also have a cooling apparatus 29 and/or mounting apparatus 37 like the exemplary embodiment described with the aid of FIG. 5. Furthermore, the two active part segments 7, 9 of a segment pair 3 can also oppose one another in another direction instead of in respect of the reaction element circle 11 in the radial direction. For instance, the two active part segments 7, 9 of a segment pair 3 can oppose one another in an axial direction with respect to the axis of rotation 6, so that they run on different sides of the plane, in which the reaction element circle 11 runs. Furthermore, the stator 2 can have an even number of segment pairs 3, wherein the first active part segments 7 of each two adjacent segment pairs 3 are arranged on different sides of the reaction element 5.

Although the invention has been illustrated and described in more detail by the preferred exemplary embodiments, the invention is not restricted by the disclosed examples and other variations can be derived herefrom by the person skilled in the art without departing from the protective scope of the invention.

What is claimed is:

1. A rotating electric machine, comprising:
   a stator including a segment pair of first and second active part segments; and
   a rotor mounted for rotation about an axis of rotation relative to the stator and including a ring-shaped reaction element sized to extend along a reaction element circle about the axis of rotation, with a circular arc of the reaction element circle running between the two active part segments, said rotor including a number of magnetizable regions arranged in series along the reaction element circle, with a non-magnetic region being arranged between two adjacent magnetizable regions;
   wherein the first active part segment of the segment pair of the stator includes a number of electromagnets arranged in series along a course of the circular arc, and the second active part segment of the segment pair of the stator includes a number of permanent magnets arranged in series along the course of the circular arc, the electromagnets and the permanent magnets being arranged in the first and second active part segments, respectively, only in a subregion of the reaction element circle.

2. The rotating electric machine of claim 1, wherein the arrangement of the electromagnets and the permanent magnets in the subregion of the reaction element circle is provided for enabling a modular provision of the stator with a plurality of said first and second active part segments, with a number and arrangement of the electromagnets and the permanent magnets being selected to suit a requirement on the electric machine.

3. The rotating electric machine of claim 1, wherein the electromagnets and the permanent magnets are not arranged along an entire periphery of the reaction element.

4. The rotating electric machine of claim 1, wherein the first and second active part segments of the segment pair are arranged on sides of the reaction element which oppose one another radially with respect to the reaction element circle.

5. The rotating electric machine of claim 1, wherein the stator includes a number of said segment pair arranged equidistantly from one another along the reaction element circle.

6. The rotating electric machine of claim 1, wherein the stator includes an even number of said segment pair, with the first active part segments of two adjacent segment pairs being arranged on different sides of the reaction element.

7. The rotating electric machine of claim 1, further comprising a mounting apparatus configured to mount the reaction element on the stator.

8. The rotating electric machine of claim 7, wherein the mounting apparatus includes friction bearings or roller bearings to mount the reaction element on a side which faces the axis of rotation and on a side which faces away from the axis of rotation on the stator.

9. The rotating electric machine of claim 1, wherein the reaction element is mounted displaceably in a plane at a right angle to the axis of rotation relative to the stator.

10. The rotating electric machine of claim 1, further comprising a cooling apparatus for cooling at least one of the first and second active part segments.

11. The rotating electric machine of claim 1, wherein each two adjacent permanent magnets of the second active part segment have opposite magnetic polarities.

12. The rotating electric machine of claim 1, wherein two adjacent permanent magnets of the second active part segment of the segment pair face each electromagnet of the first active part segment of the segment pair.

13. The rotating electric machine of claim 1, wherein the first active part segment of the segment pair includes twelve electromagnets.

14. The rotating electric machine of claim 13, wherein the reaction element in a region of the segment pair includes seventeen or nineteen of said magnetizable regions.

15. The rotating electric machine of claim 1, wherein the electromagnets of the first active part segment of the segment pair are fed with a three-phase electric current system, with each electromagnet being assigned to a phase of the current system.

16. The rotating electric machine of claim 15, wherein the electromagnets of each phase of the current system form magnet pairs of electromagnets adjacent to one another, which have magnetic polarities which differ from one another, wherein a magnet pair of each of the two other phases lies between two magnet pairs of each phase and two adjacent electromagnets of the phases which differ from one another have a same magnetic polarity.

17. The rotating electric machine of claim 1, wherein the non-magnetic region of the reaction element is made from a ceramic material.

18. The rotating electric machine of claim 1, wherein the magnetizable regions of the reaction element are made from a soft-magnetic material.

* * * * *